United States Patent
Xie

(10) Patent No.: US 12,546,401 B1
(45) Date of Patent: Feb. 10, 2026

(54) MIXING VALVE

(71) Applicant: Guangdong Yawei Sanitary Ware Technology Co., Ltd, Guangdong (CN)

(72) Inventor: Zhonghui Xie, Guangdong (CN)

(73) Assignee: Guangdong Yawei Sanitary Ware Technology Co., Ltd., Kaiping (CN)

( * ) Notice: Subject to any disclaimer, the term of this patent is extended or adjusted under 35 U.S.C. 154(b) by 0 days.

(21) Appl. No.: 19/036,125

(22) Filed: Jan. 24, 2025

(30) Foreign Application Priority Data

Oct. 15, 2024 (CN) .......................... 202422499525.6

(51) Int. Cl.
  *F16K 11/074* (2006.01)
  *G05D 23/13* (2006.01)

(52) U.S. Cl.
  CPC ............ *F16K 11/074* (2013.01); *G05D 23/13* (2013.01); *G05D 23/1313* (2013.01); *G05D 23/136* (2013.01)

(58) Field of Classification Search
  CPC . F16K 11/074; G05D 23/136; G05D 23/1313
  See application file for complete search history.

(56) References Cited

U.S. PATENT DOCUMENTS

| 7,779,865 | B2 * | 8/2010 | Shay | F16K 3/04 137/454.6 |
| 7,918,241 | B1 * | 4/2011 | Chang | G05D 23/1313 137/607 |
| 8,931,706 | B2 * | 1/2015 | Lin | G05D 23/136 236/12.1 |
| 10,031,532 | B2 * | 7/2018 | Zhu | G05D 23/1313 |
| 10,054,235 | B2 * | 8/2018 | Chang | E03C 1/04 |
| 10,281,935 | B2 * | 5/2019 | Ye | G05D 23/1313 |
| 2011/0266355 | A1 * | 11/2011 | Yang | F16K 11/0743 236/12.15 |
| 2015/0144214 | A1 * | 5/2015 | Chang | F16K 27/045 137/625.41 |
| 2018/0275695 | A1 * | 9/2018 | Chang | F16K 11/00 |
| 2023/0052109 | A1 * | 2/2023 | Wang | G05D 23/1313 |

* cited by examiner

*Primary Examiner* — Craig M Schneider
*Assistant Examiner* — Christopher D Ballman

(57) ABSTRACT

A mixing valve includes a balance assembly, and the balance valve assembly includes a hot water outlet and a cold water outlet. A plate assembly includes a first water limiting hole and a second water limiting hole, the valve adjusting assembly is rotatable with respect to the balance valve assembly to adjust an amount of fluid communicating between the water limiting hole and the water outlet to adjust a water temperature. A valve rod is connected to the valve adjusting assembly to drive the valve adjusting assembly to rotate. A temperature limiting ring defines a limiting opening, the valve rod extends through the limiting opening; the valve rod is arranged with a block; the limiting opening limits a rotation angle of the block. A valve body sleeves an outside of the valve adjusting assembly, a gap is defined between the valve body and the valve adjusting assembly.

20 Claims, 8 Drawing Sheets

MIXING VALVE

CROSS-REFERENCE TO RELATED APPLICATIONS

The present application claims the priority of the Chinese patent application No. 202422499525.6, filed on Oct. 15, 2024, contents of which are incorporated herein by its entireties.

TECHNICAL FIELD

Embodiments of the present disclosure relate to the technical field of fluid devices, and more specifically, to a mixing valve.

BACKGROUND

The mixing valve is a valve configured to adjust a temperature of mixed water and is widely used in electric water heaters, solar water heaters, and centralized heating water syvalve rods. The mixing valve controls a ratio for mixing cold water and hot water to achieve a desired water temperature. The mixing valve is generally arranged with a rotation limiting member configured to prevent a valve rod from rotating beyond a certain angle and to limit a proportional flow rate of the cold water and the hot water to control the temperature of the mixed water delivered at an outlet. However, the rotation limiting member currently in the art has a complicated structure, a stopping limiting member is arranged to sleeve the valve rod, and a stopping member is arranged inside the mixing valve to operate cooperatively with the stopping limiting member. A shape and an angle of the stopping limiting member are mated with a shape and an angle of the stopping member, such that a rotation angle of the valve rod can be adjusted and limited.

SUMMARY

The present disclosure provides a mixing valve, including: a balance valve assembly, a plate assembly, a valve rod, a temperature limiting ring, and a valve body. The balance valve assembly includes a hot water outlet and a cold water outlet. The plate assembly includes a first water limiting hole and a second water limiting hole, wherein the valve adjusting assembly is rotatable with respect to the balance valve assembly to adjust an amount of fluid communicating between the first water limiting hole and the hot water outlet and an amount of fluid communicating between the second water limiting hole and the cold water outlet, so as to adjust a water temperature. The valve rod is connected to the valve adjusting assembly to drive the valve adjusting assembly to rotate. The temperature limiting ring defines a limiting opening, wherein the valve rod extends through the limiting opening; the valve rod is arranged with a block; the limiting opening is configured to limit a rotation angle of the block to limit a maximum water temperature. The valve body sleeves an outside of the valve adjusting assembly, a gap is defined between the valve body and the valve adjusting assembly, mixed water from the first water limiting hole and the second water limiting hole is capable of flowing out of the mixing valve through the gap.

Figure 1:
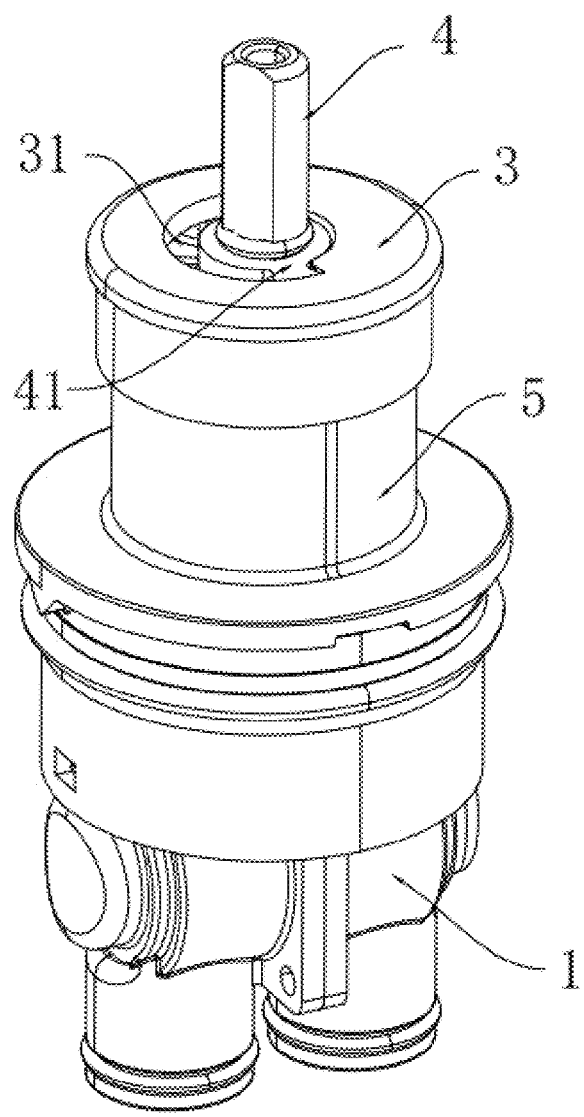
FIG. 1 is a structural schematic view I of a mixing valve according to an embodiment of the present disclosure.

Reference numerals in the drawings: 1—balance valve assembly: 2—valve adjusting assembly: 3—temperature limiting ring: 4—valve rod: 5—valve body: 6—gap: 12—hot water outlet: 13—cold water outlet: 221—first water limiting hole: 222—second water limiting hole: 31—limiting opening: 41—block: 311—sector region: 312—through region: 21—bracket: 22—valve sheet: 2114—bottom of the bracket: 2111—through hole; 2113—water outlet: 211—base: 212—receiving portion; 2115—peripheral side of the base: 2116—divider; 2118—divided cavity: 11—shell: 17—first end: 18—second end: 14—hot water inlet: 15—cold water inlet: 19—outlet pipe: 110—rubber pad: 1101—opening: 111—spring: 51—opening end: 52—connection end: 16—snap: 53—recess: 2117—flange: 56—snap slot: 58—inner side wall of the valve body: 57—limiting block: 54—connection portion: 55—outer gear; 42—inner gear: 112—fluid channel: 223—catcher; 2112—receiving slot.

DETAILED DESCRIPTIONS

In order to make the purpose, technical solutions and advantages of the present disclosure clearer, embodiments of the present disclosure will be described in further detail in the following by referring to the accompanying drawings.

To be noted that the terms "first", "second", and so on in the specification, claims and the accompanying drawings of the present disclosure are used to distinguish similar objects from each other and are not used to describe a particular order or sequence. It should be understood that features described by these terms may be interchanged with each other where appropriate. The embodiments of the present disclosure can be implemented in an order other than the order illustrated or described herein.

In the description of the present disclosure, it is to be noted that, unless otherwise expressly provided and limited, terms "arranged," "mounted," "connected," and "coupled" shall be used understood in a broad sense. For example, connection can be fixed connection, detachable connection, or connection to form a one-piece structure; or can be mechanical connection; direct connection, indirect connection through an intermediate medium, internal connection within two elements. Any ordinary skilled person in the art shall understand specific meanings of the above terms in the present disclosure case by case.

In the description of the present disclosure, reference to the terms "embodiment", "an embodiment", and "one embodiment" means that specific features, structures, materials, or characteristics described in an embodiment or example are included in at least one embodiment or example of the present disclosure. In the present specification, schematic expressions of the above terms do not necessarily refer to one same embodiment or example. Moreover, the specific features, structures, materials, or characteristics may be combined in any one or more of the embodiments or implementations in a suitable manner.

The present disclosure is described in detail below by referring to the accompanying drawings.

To solve the above technical problems, as shown in FIGS. 1-4, the present disclosure provides a mixing valve including the following.

A balance valve assembly 1 includes a hot water outlet 12 and a cold water outlet 13.

A valve adjusting assembly 2 includes a first water limiting hole 221 and a second water limiting hole 222. The valve adjusting assembly 2 is rotatable with respect to the balance valve assembly 1 to adjust the amount of fluid communicating between the first water limiting hole 221 and the hot water outlet 12 and the amount of fluid communicating between the second water limiting hole 222 and the cold water outlet 13, such that a water temperature is adjusted.

A valve rod 4 is connected to the valve adjusting assembly 2 to drive the valve adjusting assembly 2 to rotate.

A temperature limiting ring defines a limiting opening 31. The valve rod 4 extends through the limiting opening. The valve rod 4 is arranged with a block 41. The limiting opening 31 is configured to limit a rotation angle of the block 41 to limit a maximum water temperature.

A valve body 5 sleeves an outside of the valve adjusting assembly 2. A gap 6 is defined between the valve body 5 and the valve adjusting assembly 2. Mixed water from the first water limiting hole 221 and the second water limiting hole 222 flow out the valve through the gap 6.

To be noted that the valve adjusting assembly 2 is driven by the valve rod 4 to rotate, such that the first water limiting hole 221 and the second water limiting hole 222 can be selectively communicated with the hot water inlet 14 and the cold water inlet 15, respectively. As the valve rod 4 is rotated counterclockwise, the first water limiting hole 221 and the hot water outlet 12 gradually change, due to the rotation, from a closed state to a maximum fluid communication state, and the second water limiting hole 222 and the cold water outlet 13 gradually change, due to the rotation, from a maximum fluid communication state to a closed state. When the valve rod 4 rotates clockwise, the first water limiting hole 221 and the hot water outlet 12 gradually change, due to the rotation, from the maximum fluid communication state to the closed state, and the second water limiting hole 222 and the cold water outlet 13 gradually change, due to the rotation, from the closed state to the maximum fluid communication state. In this way, rotating the valve rod 4 adjust a ratio of the hot water to the cold water, such that the temperature of the mixed water is adjusted. In the present embodiment, a limiting opening 31 is defined in a traditional temperature limiting ring 3, and the block 41 is arranged on the valve rod 4 correspondingly. The limiting opening 31 limits a maximum rotation angle of the valve sheet, such that the water temperature is adjusted, and the maximum water temperature is limited. A structure of the valve of the present disclosure is simple, and the valve can be produced and assembled easily.

Figure 2:
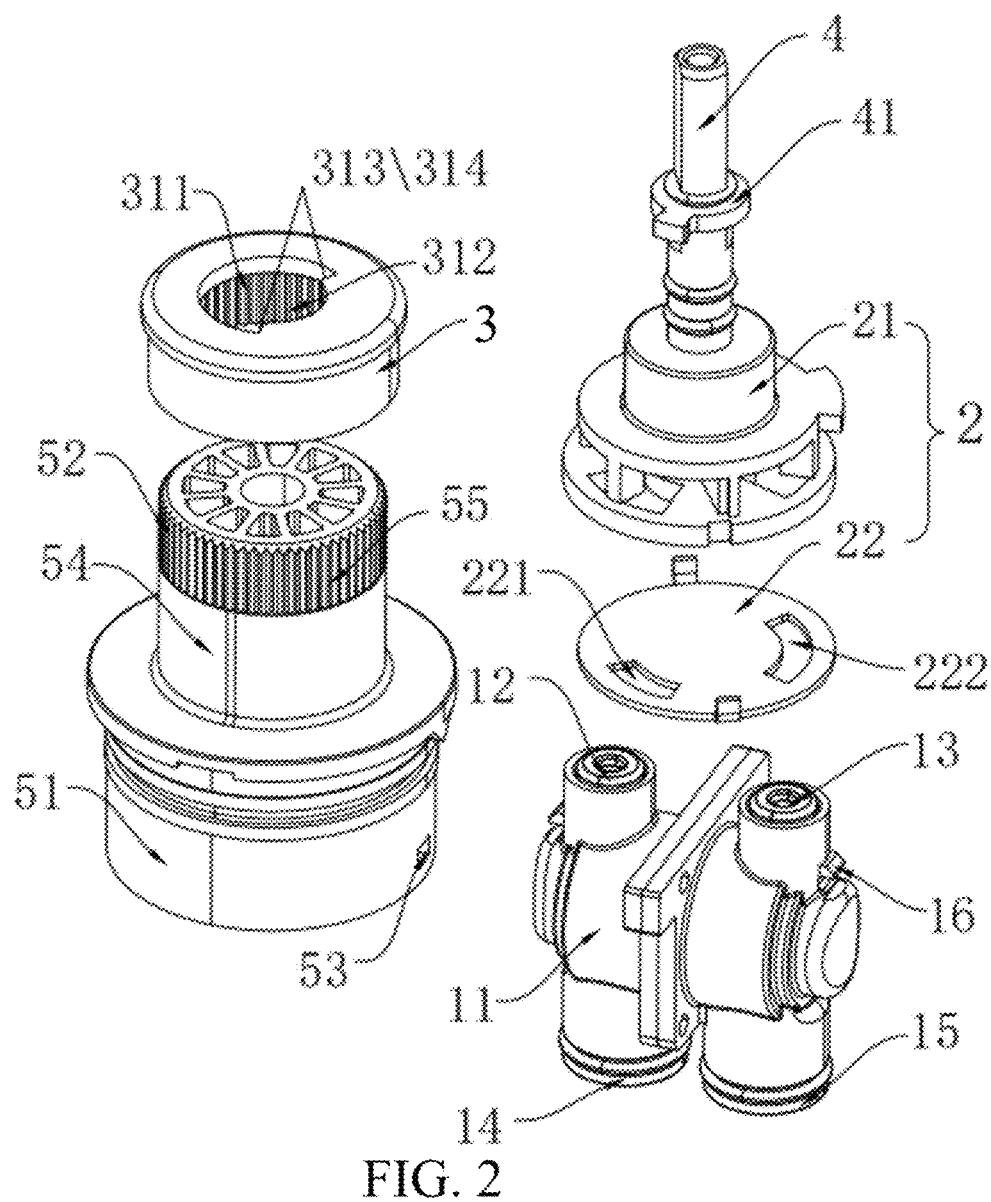
FIG. 2 is an exploded view I of the mixing valve according to an embodiment of the present disclosure.
Figure 4:
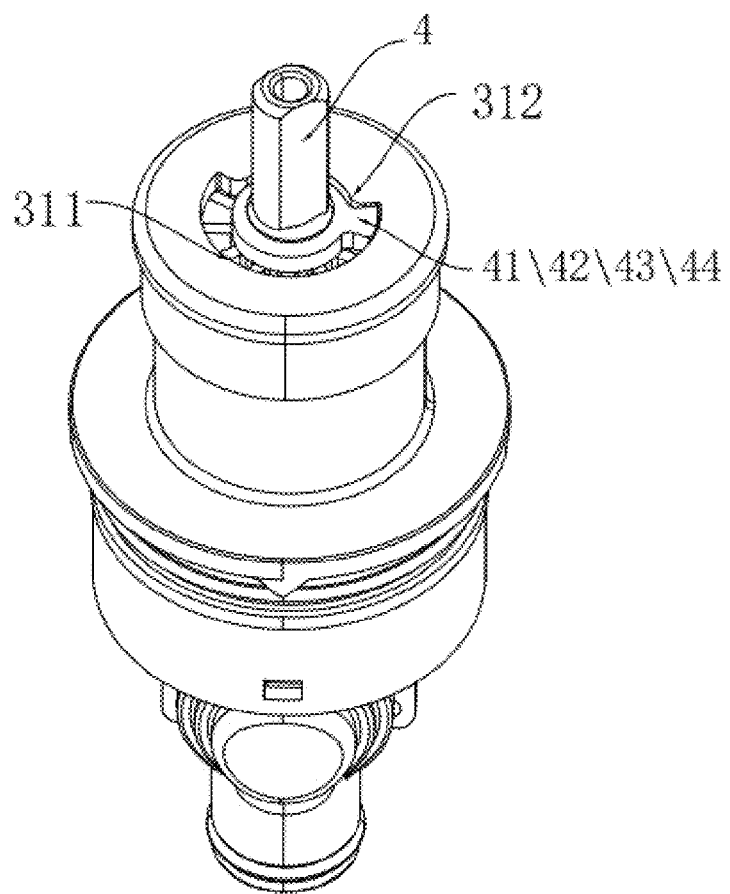
FIG. 4 is a structural schematic view II of the mixing valve according to an embodiment of the present disclosure.

In an embodiment, as shown in FIGS. 2 and 4, the limiting opening 31 includes a through region 312 where the valve rod 4 extends through and a sector region 311 located at an outside of the through region 312. The sector region 311 receives the block 41, and the block 411 can rotate inside the sector region 311. Two limiting surfaces 314 are formed respectively at two sides 313 of the sector region 311 and abut against the block 41 to limit rotation of the block 41.

To be noted that the limiting opening 31 is defined in a top surface of the temperature limiting ring 3. The through region 312 is circular taking an axis of the valve rod 4 as a circle center, and the valve rod 4 extends through the through region 312. The sector region 311 is located at a side of the through region 312. In some embodiments, the sector region 311 is communicated with the through region 312. A radius of the sector region 311 greater than a distance between an outermost part of the block 41 and the axis of the valve rod 4. In this way, the block 41 can be received in and rotate in the sector region 311. A radius of the through region 312 is smaller than the distance between the outermost part of the block 41 and the axis of the valve rod 4. In this way, the two limiting surfaces 314 can be formed at connection between the sector region 311 and the through region 312 to limit rotation of the valve rod 4. In some embodiments, the block 41 is disposed at a right angle with respect to the valve rod 4, such that the block has a small size. When the block 41 is disposed attaching to one of the two limiting surfaces 314 and can rotate counterclockwise within the sector region 311, the first water limiting hole 221 and the hot water outlet 12 change, due to the rotation, from the closed state to the maximum fluid communication state, and the second water limiting hole 222 and the cold water outlet 13 change, due to the rotation, from the maximum fluid communication state to the closed state. When the block 41 is disposed attaching to the other one of the two limiting surfaces 314 and can rotate clockwise within the sector region 311, the first water limiting hole 221 and the hot water outlet 12 change, due to the rotation, from the maximum fluid communication state to the closed state, and the second water limiting hole 222 and the cold water outlet 13 change, due to the rotation, from the closed state to the maximum fluid communication state.

In an embodiment, as shown in FIG. 4, the block 41 and the valve rod 4 are configured as a one-piece and integral structure.

To be noted that, in some embodiments, the block 41 is a bump 42 that is integrally formed with the valve rod 4. That is, the bump is formed on the valve rod 4 and is protruding in a direction away from the valve rod 4. In another embodiment, the block 41 may be configured as a stopping bolt 43 that is transversely inserted in the valve rod 4 for limiting. It is understood that the block 41 may alternatively be configured as a limiting tab 43 sleeving the outside of the valve rod 4. The limiting tab 43 is arranged with a protrusion, protruding in a direction away from the valve rod 4 to be mated with the limiting opening 31 at a certain angle to achieve limiting.

Figure 3:
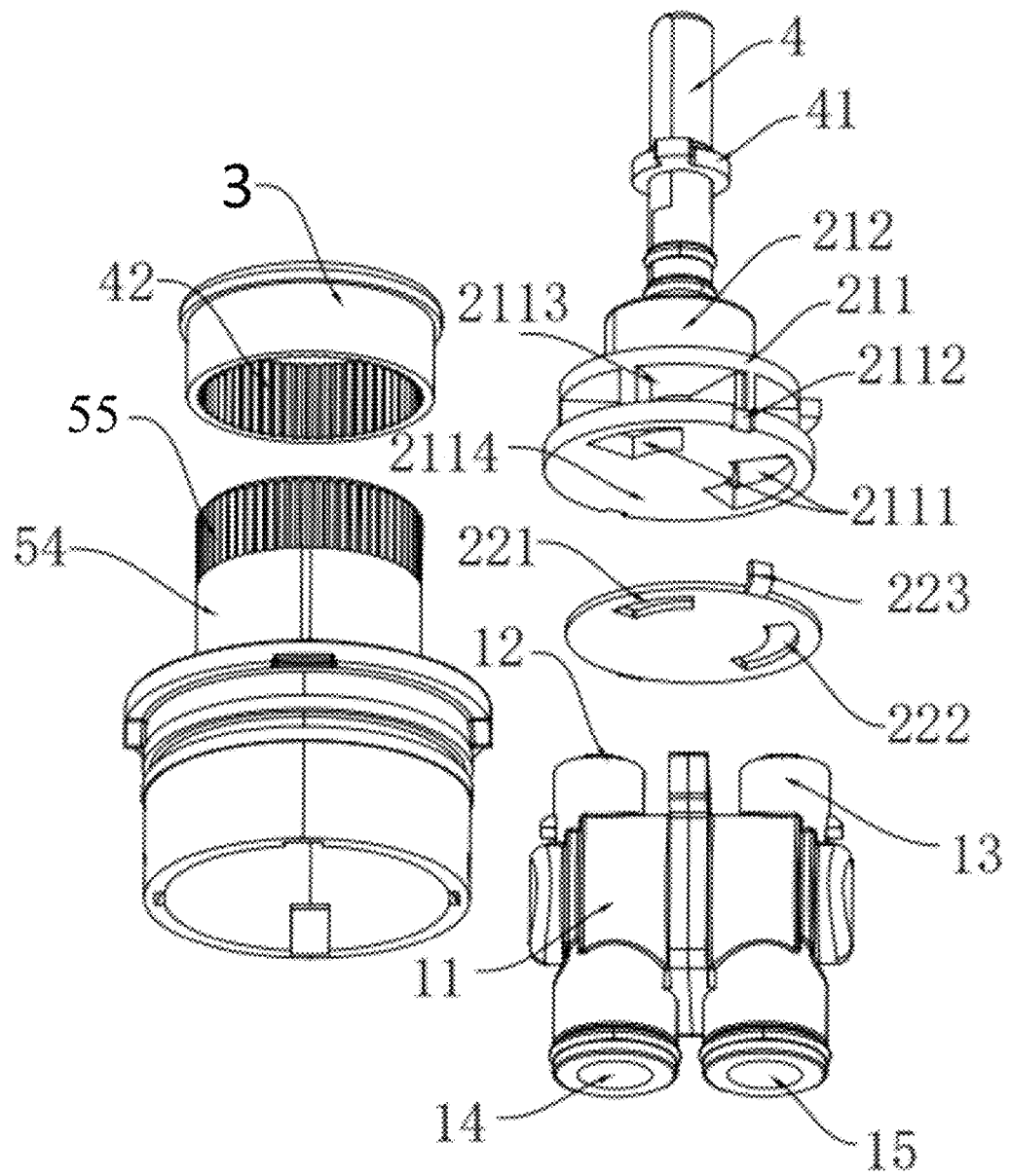
FIG. 3 is an exploded view II of the mixing valve according to an embodiment of the present disclosure.
Figure 5:
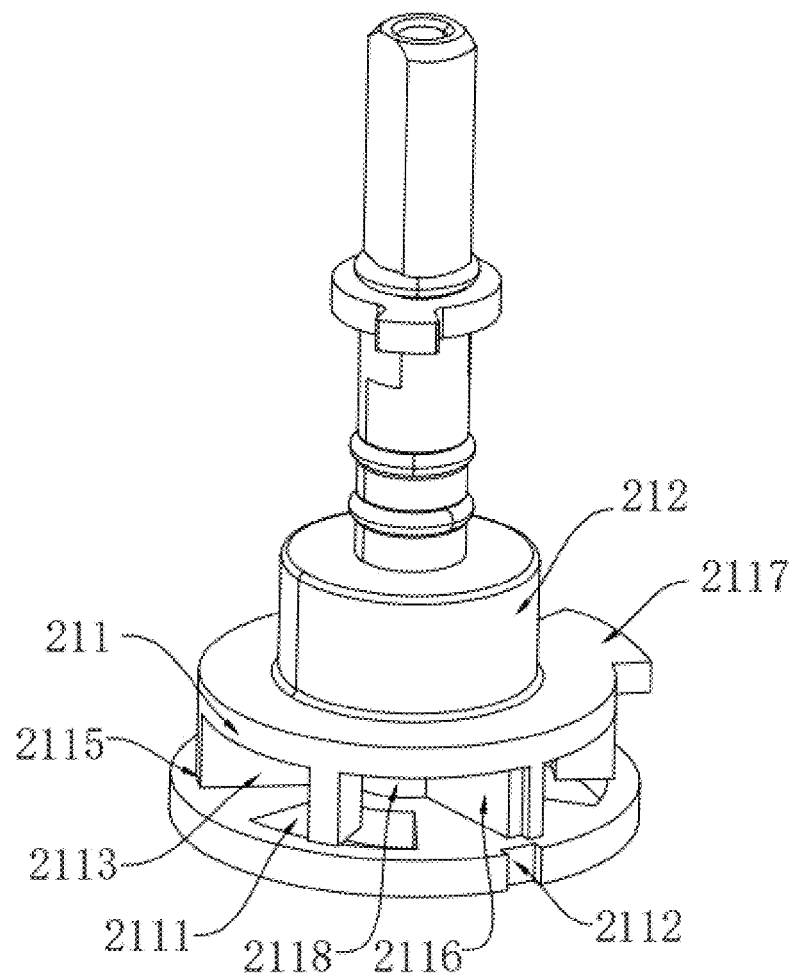
FIG. 5 is a structural schematic view of a valve adjusting assembly according to an embodiment of the present disclosure.

In an embodiment, as shown in FIGS. 2, 3 and 5, the valve adjusting assembly 2 includes a valve sheet 22 and a bracket 21. The valve sheet 22 is disposed at a bottom of the bracket 21. The first water limiting hole 221 and the second water limiting hole 222 are defined in the valve sheet 22. A bottom 2114 of the bracket 21 defines two through holes 2111 respectively communicated with the first water limiting hole 221 and the second water limiting hole 222. The bracket 21 further defines a water outlet 2113 communicating with the two through holes 2111 for mixing water and for outputting water.

To be noted that, the valve sheet 22 is a circular thin sheet. Each of the first water limiting hole 221 and the second water limiting hole 222 is a sector of a circle having one circle center. The bottom 2114 of the bracket 21 defines the two through holes 2111 to be fully communicated with the first water limiting hole 221 and the second water limiting hole 222, respectively. In this way, the cold water and the hot water can be conveyed into the bracket 21. The bracket 21 defines the water outlet 2113. The cold water and the hot water are mixed after flowing out through the water outlet 2113. At least one catcher is arranged at a peripheral side of the valve sheet 22 and is upwardly extending. A peripheral side 2115 of a base 211 defines at least one receiving slot 2112 to receive the at least one catcher 223. In this way, the valve sheet 22 and the bracket are assembled with each other. Since the valve sheet 22 and the bracket 21 are configured as two separatable components, disassembling and replacement can be performed easily.

In an embodiment, as shown in FIG. 5, the bracket 21 includes the base 211 and a receiving portion 212 connected to the base 211. The peripheral side 2115 of the base 211 has openings to form the water outlet 2113. A plurality of dividers 2116 are arranged in the base 211 and extending from a center of the base 211 to the peripheral side 2115 of the base 211, such that a plurality of divided cavities 2118 are formed. The first water limiting hole 221 and the second water limiting hole 222 are communicated with two of the plurality of divided cavities 2118.

To be noted that the plurality of divided cavities 2118 are defined in the base 211. The peripheral side 2115 of the base 211 has openings. In this way, each of the plurality of divided cavities 2118 has one water outlet 2113. The hot water and the cold water respectively flow through the first water limiting hole 221 and the second water limiting hole 222 to reach two of the plurality of divided cavities 2118, and then flow out of the two divided cavities 2118 through two respective water outlets 2113. In this way, the hot water and the cold water are prevented from flowing reversely after mixing in the bracket 21, and therefore, water outflow from the balance valve assembly 1 is not affected, and the water temperature is not affected.

Figure 7:
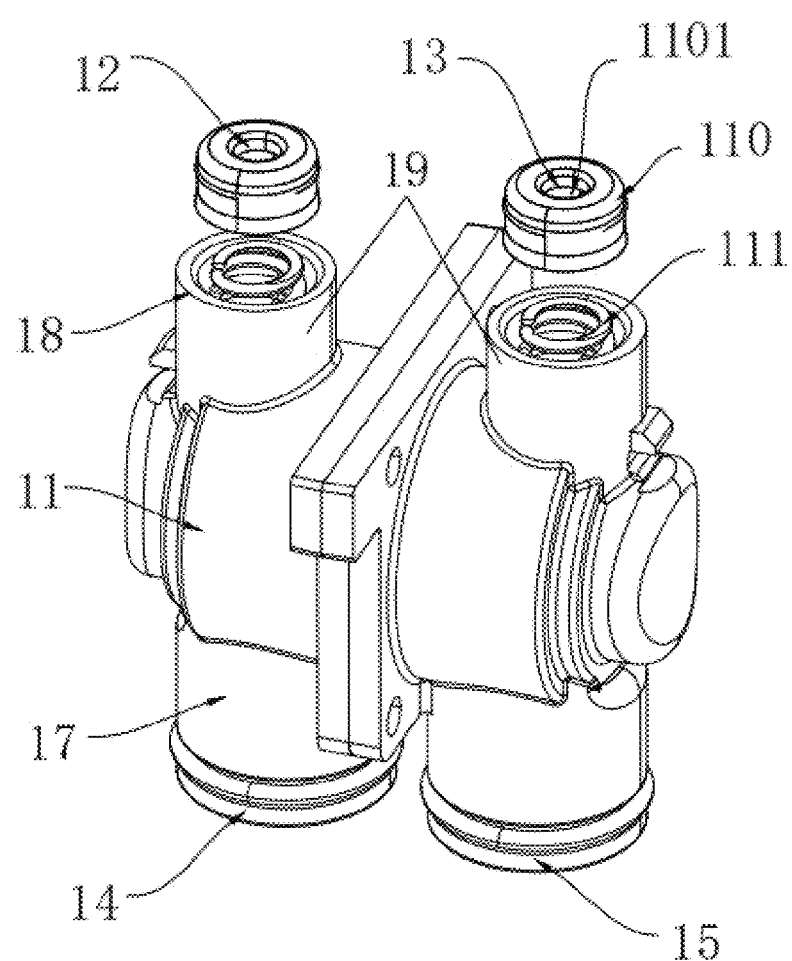
FIG. 7 is a structural schematic view of a balance valve assembly according to an embodiment of the present disclosure.
Figure 8:
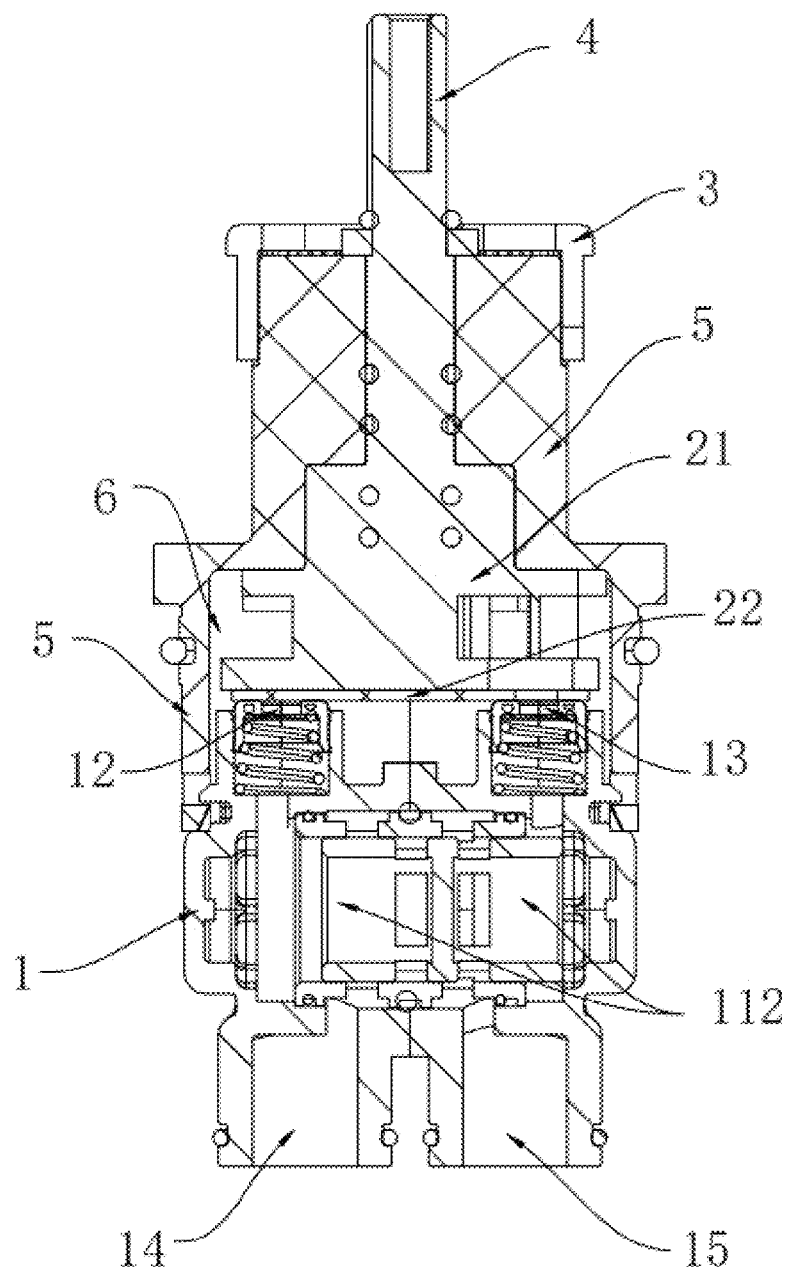
FIG. 8 is a cross-sectional view of the mixing valve according to an embodiment of the present disclosure.

In an embodiment, as shown in FIGS. 7 and 8, the balance valve assembly 1 includes a shell 11. The shell 11 includes a first end 17 and a second end 18. The first end 17 defines a hot water inlet 14 and a cold water inlet 15. The second end 18 is arranged with two outlet pipes 19. In this way, the hot water outlet 12 and the cold water outlet 13 are formed respectively. The shell 11 is further arranged with two fluid channels 112 therein, communicating the hot water inlet 14 with the hot water outlet 12 and communicating the cold water inlet 15 with the cold water outlet 13. A rubber pad 110 is elastically inserted into each of two outlet pipes 19. The rubber pad 110 has an opening 1101. The rubber pad 110 abuts against the valve adjusting assembly 2, or the opening 1101 is communicated with the first water limiting hole 221 and the second water limiting hole 222 for water outlet.

It is to be noted that the two outlet pipes 19 are arranged at each of the first end 17 and the second end 18 of the balance valve assembly 1, such that the hot water inlet 14 and the cold water inlet 15 are formed at the first end 17, and the hot water outlet 12 and the cold water outlet 13 are formed at the second end 18. The two fluid channels 112 are arranged in the shell 11 and are separated from each other, such that the hot water and the cold water are separated from each other, preventing water mixing. The rubber pad 110 is arranged in each of the two outlet pipes 19 at the first end 17. The rubber pad 110 has the opening 1101, such that water is discharged through the opening 1101 of the rubber pad 110. The rubber pad 110 is elastically inserted in each of the two outlet pipes 19 by a spring 111. When the valve sheet 22 is rotated to cause the opening 1101 of the rubber pad 110 to be dis-communicated with the first water limiting hole 221 or the second water limiting hole 222, the rubber pad 110 abuts against the valve sheet 22 to seal and press the opening 1101 of the rubber pad 110, such that the hot water or the cold water are blocked from flowing. When the valve sheet 22 is rotated to enable the first water limiting hole 221 and the second water limiting hole 222 to be communicated with the opening 1101 of the rubber pad 110, the hot water or the cold water can flow.

Figure 6:
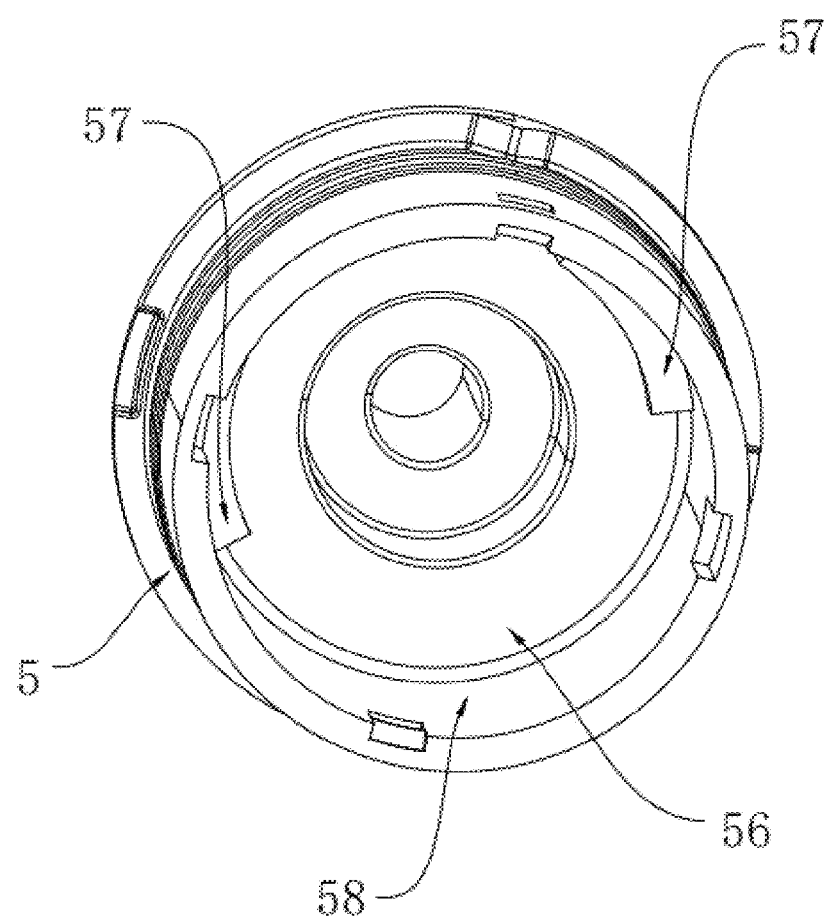
FIG. 6 is a structural schematic view of a valve body according to an embodiment of the present disclosure.

In an embodiment, as shown in FIGS. 2 and 6, the valve body 5 sleeves outside of the balance valve assembly 1 and the bracket 21. The valve body 5 includes an opening end 51 and a connection end 52. The first end 17 of the balance valve assembly 1 extends through and exposed from the opening end 51. The valve rod 4 extends through the connection end 52. The balance valve assembly 1 is arranged with at least one snap 16. The valve body 5 defines at least one recess 53 to receive and snap with the balance valve assembly 1. The base 211 of the bracket 21 is arranged with a flange 2117. An inner side wall of the valve body 5 defines a curved snap slot 56 to receive the flange 2117 for rotation.

To be noted that the valve body 5 is configured to enable the balance valve assembly 1 and the valve adjusting assembly 2 to be connected and assembled to each other. The valve body 5 defines a receiving cavity. The balance valve assembly 1 and the valve adjusting assembly 2 are received in the receiving cavity. The valve body 5 has the opening end 51, and the first end 17 of the balance valve assembly 1 extends through the opening end 51 to be connected to an external hot water pipe and an external cold water pipe. In some embodiments, a snap 16 is arranged at each of two sides of the shell of the balance valve assembly 1 and is snapped with a respective one of the two recesses 53. In this way, the balance valve assembly 1 is assembled. The flange 2117 is arranged on the base 211 of the bracket 21, and at least two limiting blocks 57 are arranged on an inner side wall of the valve body 5 and are spaced apart from each other. A curved snap slot 56 is formed between two of the at least two limiting blocks 57. When connecting the bracket 21, the bracket 21 can be received in the snap slot 56 for rotation.

In an embodiment, as shown in FIG. 8, the gap 6 is defined between the valve body 5 and the peripheral side of the base 211 of the bracket 21 to enable the water from the water outlet 2113 to flow through the gap 6 to further flow through the opening end 51 of the valve body 5.

To be noted that the gap 6 is defined to enable the cold water and the hot water to flow through the water outlet 2113 to be mixed with each other, and the mixed water flows through the gap 6 to reach the opening end 51 of the valve body 5, such that water mixing and water output are achieved. It is understood that the gap 6 is defined between the balance valve assembly 1 and the valve body 5, such that the mixed water flows out the valve through an outside of the balance valve assembly 1.

In an embodiment, as shown in FIGS. 2 and 3, a diameter of the connection end 52 is smaller than a diameter of the opening end 51, such that a connection portion 54 is formed at the connection end 52. The connection portion 54 sleeves an outside of the receiving portion 212 to block the water from the water outlet 2113 from flowing between the receiving portion 212 and the connection portion 54.

It is to be noted that the connection portion 54 is attached to the receiving portion 212. That is, no gap 6 is formed between the connection portion 54 and the receiving portion 212, and a top surface of the receiving portion 212 is closed. In this way, the mixed water from is blocked from flowing out through any space between the receiving portion 212 and the connection portion 54, such that water leakage is prevented.

In an embodiment, as shown in FIGS. 2 and 3, the temperature limiting ring 3 is arranged covering the connection portion 54. The temperature limiting ring 3 and the connection portion 54 are detachably arranged. In this way, when the temperature limiting ring 3 is detached from the connection portion 54, an initial position of the block 41 is adjusted by rotation, and the temperature limiting ring 3 is arranged to cover the connection portion 54 again.

To be noted that, in some embodiments, the temperature limiting ring 3 and the connection portion 54 are guided to be meshed with each other in a vertical direction by an outer gear 55 and an inner gear 42. When the maximum water temperature needs to be adjusted, a user manually pulls up the temperature limiting ring 3 to disengage the temperature limiting ring 3 from the connection portion 54, the user may rotate the temperature limiting ring 3 to a desired angle and then presses the temperature limiting ring 3 to cover the connection portion 54. In this way, since an angle of the temperature limiting ring 3 is adjusted, an initial angle between the sector region 311 and the block 41 is changed, and that is, an angle at which the block 41 can be rotated counterclockwise is increased or decreased, such that the maximum water temperature is adjusted. In some embodiments, corresponding temperatures can be marked on an outer periphery of the connection portion 54. In this way, a maximum counterclockwise rotation angle of the block 41 may be aligned with one of the marked temperatures to assist the user in adjusting the temperature.

It is to be noted that each of the above technical features can be further combined with each other to form various embodiments that are not illustrated in the above, and the various embodiments shall be within the scope of the specification of the present disclosure. Any ordinary skilled person in the art may perform improvement or transformation based on the above description, and the improvement or transformation shall fall within the scope of the appended claims of the present disclosure.

What is claimed is:

1. A mixing valve, comprising:
   a balance valve assembly, comprising a hot water outlet and a cold water outlet;
   a valve adjusting assembly, defining a first water limiting hole and a second water limiting hole, wherein the valve adjusting assembly is rotatable with respect to the balance valve assembly to adjust an amount of fluid communicating between the first water limiting hole and the hot water outlet and an amount of fluid communicating between the second water limiting hole and the cold water outlet, so as to adjust a water temperature;
   a valve rod, connected to the valve adjusting assembly to drive the valve adjusting assembly to rotate;
   a temperature limiting ring, defining a limiting opening, wherein the valve rod extends through the limiting opening; the valve rod is arranged with a block; the limiting opening is configured to limit a rotation angle of the block to limit a maximum water temperature;
   a valve body, sleeving an outside of the valve adjusting assembly, a gap is defined between the valve body and the valve adjusting assembly, mixed water from the first water limiting hole and the second water limiting hole is capable of flowing out of the mixing valve through the gap;
   wherein the valve body comprises a connection end; the valve rod extends through the connection end; a connection portion is formed at the connection end; the temperature limiting ring is arranged covering the connection portion and is detachably arranged with the connection portion; and
   the connection portion is arranged with an outer gear at an outer peripheral surface of the connection portion; the temperature limiting ring is arranged with an inner gear at an inner surface of the temperature limiting ring;
   when the temperature limiting ring sleeves the connection portion at a first position, the inner gear is meshed with the outer gear to fix the temperature limiting ring with the connection portion, and the temperature limiting ring is capable of rotating to adjust the water temperature within a first temperature range;
   when the temperature limiting ring sleeves the connection portion at a second position different from the first position, the inner gear is meshed with the outer gear to fix the temperature limiting ring with the connection portion, and the temperature limiting ring is capable of rotating to adjust the water temperature within a second temperature range that is at least partially different from the first temperature range.

2. The mixing valve according to claim 1, wherein the limiting opening comprises a through region where the valve rod extends through and a sector region located at an outside of the through region; the sector region receives the block, and the block is capable of rotating inside the sector region; two limiting surfaces are formed respectively at two sides of the sector region and abut against the block to limit rotation of the block.

3. The mixing valve according to claim 1, wherein a radius of the sector region greater than a distance between an outermost edge of the block and an axis of the valve rod; the block is received in and rotatable in the sector region; a radius of the through region is smaller than the distance between the outermost edge of the block and the axis of the valve rod, and the two limiting surfaces are formed at connection between the sector region and the through region to limit rotation of the valve rod.

4. The mixing valve according to claim 1, wherein the block and the valve rod are configured as a one-piece and integral structure.

5. The mixing valve according to claim 4, wherein the block is a bump that is integrally formed with the valve rod; the bump is formed on the valve rod and is protruding in a direction away from the valve rod.

6. The mixing valve according to claim 1, wherein the valve adjusting assembly comprises a valve sheet and a bracket; the valve sheet is disposed at a bottom of the bracket; the first water limiting hole and the second water limiting hole are defined in the valve sheet; the bottom of the bracket defines two through holes respectively communicated with the first water limiting hole and the second water limiting hole; the bracket further defines a water outlet communicating with the two through holes for mixing water and for outputting water; and
   cold water from the cold water outlet of the valve adjusting assembly and hot water from the hot water outlet of the valve adjusting assembly are capable of being mixed with each other after flowing out of the water outlet of the bracket and being mixed in the gap between the valve body and the valve adjusting assembly.

7. The mixing valve according to claim 6, wherein the bracket comprises a base and a receiving portion connected to the base; a peripheral side of the base has openings to serve as the water outlet; a plurality of dividers are arranged in the base and extending from a center of the base to the peripheral side of the base, a plurality of divided cavities are formed based on the plurality of dividers; the first water limiting hole and the second water limiting hole are communicated with two of the plurality of divided cavities.

8. The mixing valve according to claim 7, wherein the valve body sleeves outside of the balance valve assembly and the bracket; the valve body further comprises an opening end; the first end of the balance valve assembly extends through and exposed from the opening end; the balance valve assembly is arranged with at least one snap; the valve body defines at least one recess to correspondingly receive the at least one snap to snap with the balance valve assembly; the base of the bracket is arranged with a flange; an inner side wall of the valve body defines a curved snap slot to receive the flange for rotation.

9. The mixing valve according to claim 8, wherein at least one catcher is arranged at a peripheral side of the valve sheet and is upwardly extending; a peripheral side of the base defines at least one receiving slot to receive the at least one catcher.

10. The mixing valve according to claim 8, wherein the gap is defined between the valve body and the peripheral side of the base of the bracket to enable water from the water outlet to flow through the gap to further flow through the opening end of the valve body.

11. The mixing valve according to claim 8, wherein a diameter of the connection end is smaller than a diameter of the opening end; the connection portion is attached to and sleeves an outside of the receiving portion to block the water from the water outlet from flowing between the receiving portion and the connection portion.

12. The mixing valve according to claim 11, wherein no gap is formed between the connection portion and the receiving portion, and a top surface of the receiving portion is closed.

13. The mixing valve according to claim 1, wherein the balance valve assembly comprises a shell; the shell comprises a first end and a second end; the first end defines a hot water inlet and a cold water inlet; the second end is arranged with two outlet pipes to form the hot water outlet and the cold water outlet respectively; the shell is further arranged with two fluid channels therein to communicate the hot water inlet with the hot water outlet and to communicate the cold water inlet with the cold water outlet; a rubber pad is elastically inserted into each of the two outlet pipes; the rubber pad has an opening; the rubber pad abuts against the valve adjusting assembly, or the opening of the rubber pad is communicated with the first water limiting hole and the second water limiting hole for water outlet.

14. The mixing valve according to claim 13, wherein the rubber pad is elastically inserted in each of the two outlet pipes by a spring.

15. The mixing valve according to claim 14, wherein the valve adjusting assembly comprises a valve sheet and a bracket; the valve sheet is disposed at a bottom of the bracket;

when the valve sheet is rotated to cause the opening of the rubber pad to be dis-communicated with the first water limiting hole or the second water limiting hole, the rubber pad abuts against the valve sheet, the opening of the rubber pad is sealed to block hot water or cold water from flowing.

16. The mixing valve according to claim 15, wherein, when the valve sheet is rotated to enable the first water limiting hole and the second water limiting hole to be communicated with the opening of the rubber pad, the hot water or the cold water are enabled to flow.

17. The mixing valve according to claim 1, wherein when the temperature limiting ring is detached from the connection portion, an initial position of the block is adjustable by rotation to reach a second position, and the temperature limiting ring is arranged to cover the connection portion when the block is at the second position.

18. The mixing valve according to claim 17, wherein the temperature limiting ring and the connection portion are guided to be meshed with each other in a vertical direction via the outer gear and the inner gear.

19. The mixing valve according to claim 1, wherein, when the valve rod is rotated in a first direction, the first water limiting hole and the hot water outlet gradually change positions, due to the rotation, from a closed state to a maximum fluid communication state, and the second water limiting hole and the cold water outlet gradually change positions, due to the rotation, from a maximum fluid communication state to a closed state.

20. The mixing valve according to claim 19, wherein, when the valve rod rotates in a second direction opposite to the first direction, the first water limiting hole and the hot water outlet gradually change positions, due to the rotation, from the maximum fluid communication state to the closed state, and the second water limiting hole and the cold water outlet gradually change positions, due to the rotation, from the closed state to the maximum fluid communication state.

* * * * *